(12) United States Patent
Amamoto

(10) Patent No.: US 6,479,149 B1
(45) Date of Patent: Nov. 12, 2002

(54) SEPARATING MATERIAL FOR WEB SINTERING

(75) Inventor: Shuji Amamoto, Tochigi (JP)

(73) Assignee: Bridgestone Corporation, Tokyo (JP)

( * ) Notice: Subject to any disclaimer, the term of this patent is extended or adjusted under 35 U.S.C. 154(b) by 19 days.

(21) Appl. No.: 09/593,707

(22) Filed: Jun. 15, 2000

(30) Foreign Application Priority Data

Jun. 15, 1999 (JP) ............................................ 11-167570

(51) Int. Cl.$^7$ ................................................. B32B 9/00
(52) U.S. Cl. ........................ 428/408; 428/688; 428/689; 422/126.4; 422/376.2
(58) Field of Search ................................. 428/408, 688, 428/689; 427/126.4, 376.2

(56) References Cited

U.S. PATENT DOCUMENTS 3,410,651 A * 11/1968 Brandenburg

* cited by examiner

Primary Examiner—Deborah Jones
Assistant Examiner—Abraham Bahta
(74) Attorney, Agent, or Firm—Sughrue Mion, PLLC

(57) ABSTRACT

A separating material for separating a web so that the webs do not attach to each other, for use in manufacturing a metal-fiber web-sintered body such as a filter, is to be provided. In a separating material for web sintering, the thickness of a film, which is formed by thermal spraying of an alumina to a substrate, is 30 μm or over.

12 Claims, No Drawings

SEPARATING MATERIAL FOR WEB SINTERING

BACKGROUND OF THE INVENTION

1. Field of the Invention

The present invention relates to a tool for use in manufacturing a metal-fiber web-sintered body such as a filter, and more specifically, relates to a separating plate which separates a web so that the webs do not attach to each other when laminating and sintering a web to be sintered.

2. Description of the Related Art

A metal-fiber web-sintered body such as a filter is produced to have a diameter of about 10 to 40 μm by pressurizing and heating in a furnace a web of a metal fiber, such as a stainless-steel metal fiber. Upon this production, it is customary to produce simultaneously a plurality of web-sintered bodies by laminating a plurality of webs. In this case, the pressurization and heating treatment is carried out with a separating materials arranged between the webs so that the vertically adjacent webs are not sintered in a contacting condition. The characteristics required for such a separating material is as follows. It is required that the vertically arranged webs can separate, that the separating material has a heat resistance, and that the web and the separating material do not adhere to each other.

Conventionally, as such a separating material, there has been used a Fe—Cr alloy plate. In this case, an $Al_2O_3$ (alumina) film is formed on the surface of the alloy plate by heat-treating the Fe—Cr alloy plate at a predetermined temperature. The alumina film is good in heat resistance and has a low reactivity with a web, and thus, it is possible to properly separate the web. However, there are problems such that the Fe—Cr alloy plate is expensive, and that according to this method, the heat treatment has to be sufficiently controlled.

Further, as materials which use alumina and are good in separatability, there have been used an alumina-fiber paper material produced by carding alumina fibers, or a sheet-like material formed by weaving a string of alumina fibers. However, when materials using alumina fibers are used, the alumina fibers adhere to the web, causing problems such as deterioration in the quality of the web and shortening of durable life.

SUMMARY OF THE INVENTION

Accordingly, an object of the present invention attempts to achieve is to provide a separating material used during sintering which is inexpensive and is superior in separatability.

An aspect of the present invention is a separating material for web sintering which comprises a substrate and an alumina film formed by thermal spraying alumina to the substrate. The thickness of the alumina film is 30 μm or more, and preferably in the range of from 40 to 70 μm. If the alumina film is below 30 μm, there is a tendency that the thermal spray film will become uneven; if it is over 70 μm, there is a tendency that exfoliation will occur within the film.

As for the substrate, a carbon plate which is good in heat resistance and shape stability may be used, and preferably, it is possible to increase the strength thereof by using a carbon plate which is reinforced by a carbon fiber. In this case, it is possible to make the thickness of the carbon plate thinner compared to the conventional carbon plate, and further, it will be possible to effectively increase its strength by orienting the carbon fiber. Further it is possible to use a stainless-steel plate, which is more inexpensive. Also, it is possible to use a wire gauze, such as a stainless-steel wire gauze, as a substrate. In this case, there is an advantage in that it is possible to degas a gas which is generated from the web during web sintering.

DESCRIPTION OF THE PREFERRED EMBODIMENTS

In the web separating plate of the present invention, since alumina is thermal sprayed, there is a feature that thermal spraying is applicable to a wide variation of materials for substrates. Further, since a film is formed by this thermal spraying, it is possible to freely select the thickness of the film. Further, since this is a metal film, there is no conventional drawback in that a fiber, such as a metal fiber, will fall off.

An $SiO_2$ component may be added to the alumina to be thermal sprayed, according to the characteristics required for the film. Further, it is possible to add, for example, $TiO_2$ or $ZrO_2$ in order to strengthen the contact between the alumina and the substrate.

As for the material of the substrate, a ceramic may be used, which is good in heat resistance and shape stability. Examples thereof may includes a carbon plate, a carbon plate reinforced with a carbon fiber, and the like. As for the other substrates, a metal material of which shape is easy to process may be used; and it is possible to use a stainless-steel, and a titanium-metal which is good in both heat resistance and corrosion resistance.

When using a metal material, if the substrate is made to have a wire gauze shape, it will become possible to degas the gas generated from a web during treatment by pressurization and heating, and it will become possible to prevent a deterioration in quality caused by gas generation. This is because when using a metal material, there is a problem that if the generated gas is not degassed, a discoloration of the sintered body will occur because of oxidization, and a decrease in strength will be caused because of embrittlement of metal fiber.

EXAMPLE

The present invention will be explained more specifically based on these examples, but not limitative.

Example and Comparative Example

As for examples according to the present invention, alumina was thermal sprayed with a thickness of 60 μm to substrates which were: a carbon plate having a height× width×thickness of 500×400×10 mm; a stainless-steel plate of 500×400×1 mm; and a stainless-steel wire gauze having a height×width of 500×400 mm and having its mesh size of 48 M/φ-0.125 mm (wherein strings with a string diameter of 0.125 mm are woven with a mesh standard of 48 M). They were designated as Example 1, Example 2 and Example 3, respectively.

A paper-like material and sheet-like material both of alumina fiber were designated as Comparative Example 1 and Comparative Example 2.

<Characteristic Evaluation>

Each of the above-described separating materials was used, and the characteristics of each of the separating materials were evaluated by repeatingly implementing a laminated web sintering treatment.

The results are indicated in the following Table.

TABLE

| | Example 1 | Example 2 | Example 3 | Comparative Example 1 | Comparative Example 2 |
|---|---|---|---|---|---|
| Separating Material | Al thermal sprayed carbon plate | Al thermal sprayed stainless-steel plate | Al thermal sprayed stainless-steel wire gauze | Al paper | Al cloth |
| Separatability | Extremely good | Extremely good | Extremely good | Good | Poor |
| Separatability of Al Surface (Film Durable Life) | Over 50 times | Over 50 times | Over 50 times | 1 time | 15 times |
| Shape Stability upon Repetitive Use | Extremely good | Extremely good | Good | Poor | Fairly poor |
| Cost | Inexpensive | Inexpensive | Inexpensive | Expensive | Fairly expensive |

In the case where the separating materials of Examples 1 through 3 were used, the separatability of the laminated web was extremely good; however, in the case of the sheet-like material of Comparative Example 2, the separatability was poor. Also, as for the film durable life of the separating materials, all of the Examples were able to sufficiently resist a repetitive sintering treatment of more than 50 times; however, in the case of Comparative Example 1, there was a need for replacement upon each treatment; and for Comparative Example 2, there was a need for replacement after about 15 times. Further, as for the shape stability upon this repetitive use, Comparative Example 1 had no stability, and also the stability for Comparative Example 2 was not too preferable. Furthermore, upon comparison of the cost of each of the separating materials, each of the Examples was inexpensive than both the Comparative Examples.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A separating material for use in separating laminated webs from each other so that the webs do not adhere when sintering them, which comprising; a substrate and an alumina film formed by thermal spraying of an alumina to the substrate wherein the thickness of the alumina film is 30–70 $\mu$m.

2. A separating material according to claim 1 wherein the thickness of the alumina film is in a range of from 40 to 70 $\mu$m.

3. A separating material according to claim 1 wherein the substrate is a carbon plate.

4. A separating material according to claim 3 wherein the carbon plate is reinforced by a carbon fiber.

5. A separating material according to claim 1 wherein the substrate is a stainless-steel plate.

6. A separating material according to claim 1 wherein the substrate is a stainless-steel wire gauze.

7. A method of manufacturing a separating material according to claim 1, which comprises the steps of: providing a substrate and thermal spraying an alumina on to said substrate to form an alumina film thereon.

8. A method according to claim 7, wherein the thickness of the alumina film is in a range of from 40 to 70 $\mu$m.

9. A method according to claim 7, wherein the substrate is a carbon plate.

10. A method according to claim 7, wherein the carbon plate is reinforced by a carbon fiber.

11. A method according to claim 10, wherein the substrate is a stainless-steel plate.

12. A method according to claim 7, wherein the substrate is a stainless-steel wire gauze.

\* \* \* \* \*